United States Patent Office 3,473,343
Patented Oct. 21, 1969

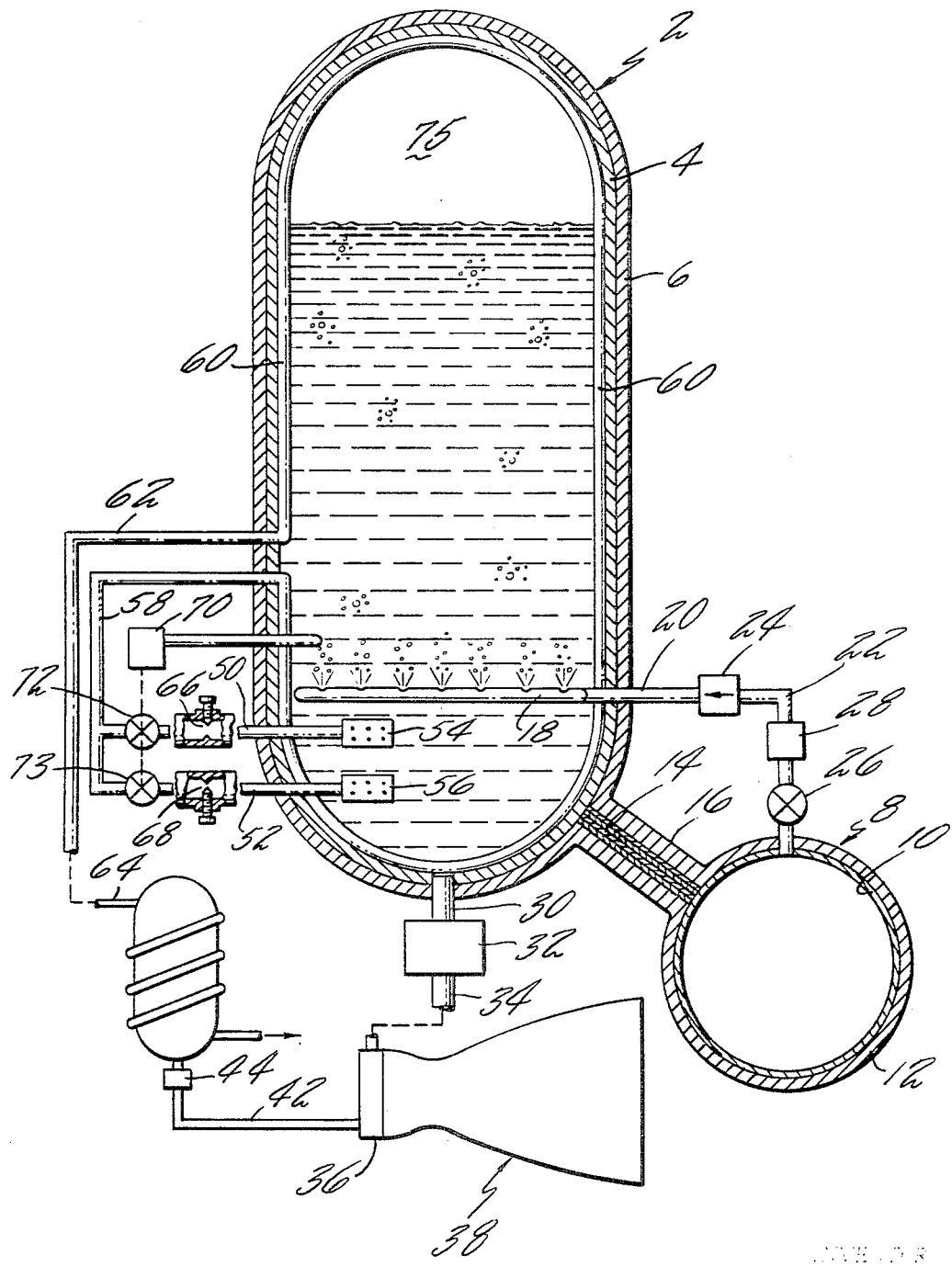

3,473,343
COLD GAS TANK PRESSURIZING SYSTEM
John Chamberlain, North Palm Beach, Fla., assignor to United Aircraft Corporation, East Hartford, Conn., a corporation of Delaware
Filed May 10, 1968, Ser. No. 728,231
Int. Cl. F17c 7/00; F02k 11/04
U.S. Cl. 62—45                                    15 Claims

ABSTRACT OF THE DISCLOSURE

A liquid propellant tank is shown having control means for maintaining the propellant at a desired pressure and temperature. A second pressurizing gas tank is mounted to the main tank by a thermal connection. Conduit means are used to permit the flow of pressurizing gas at the proper time from the pressurizing gas tankk into the propellant from the main tank. A cooling system is included which passes the propellant from the main tank at the proper time through conduits which use the evaporation of the propellant to cool the remainder of the propellant in the tank. This cooling system is also extended to surround a second propellant tank. The propellant in the main tank is shown directed to an injector on a rocket engine through a propellant control unit.

Background of the invention

This invention relates to a cold gas tank pressurizing system and particularly to a system for controlling the pressure and temperature in the tanks of cryogenic liquid propellant rocket engines. In rocket engines, it is necessary that means be provided for controlling the pressure and temperature in the tanks of cryogenic liquid propellants when they are used. As a general rule, the propellant must be provided to the rocket engine in a subcooled condition, that is, the tank pressure is greater than the vapor pressure of the liquid, otherwise, the liquid will tend to boil in the lines or pumps, and the evolution of gas will cause uncertain and faulty operation. In existing systems, the tanks are pressurized just before each rocket engine firing to eliminate boiling, and the pressurizing gas is vented off after the run to allow the liquid to boil as necessary, to remove heat absorbed by the tank.

It is difficult to provide a useful Net Positive Suction Pressure in a system operating as just referred to. A satisfactory Net Positive Suction Pressure can only be provided by repressurizing the tank for every start, and dumping pressurizing gas at the end of every run. If many runs are made, the consumption of pressurizing gas and propellant is substantial.

Summary of the invention

A primary object of the present invention is to provide an improved pressurizing system which would have the unusual capability of maintaining a propellant in a subcooled, ready to use, condition at all times as long as there is propellant in the tank. In accordance with the pressent invention, a pressurizing system is provided in which the amount of pressurizing gas needed to be carried with a vehicle is reduced from existing systems. Further, this system avoids the propellant heating and eventual propellant boil-off loss caused by warm pressurizing gas systems. This control system is also simplified because the operating mode is the same at all times. The tank pressure and temperature variations and overshoots common to most systems are avoided because the liquid and pressurizing gas are maintained in equilibrium.

Brief description of the drawing

The figure is a schematic view of a propellant tank with the control system in accordance with the present invention.

Description of the preferred embodiment

In the figure shown, the liquid propellant tank 2 is not shown with mounting means. It is to be understood that any conventional mounting means can be used to locate this tank in a vehicle. The tank 2 is formed having a pressure shell 4 encompassed by insulating means 6. While this insulation is shown on the outside of the metallic pressure shell 4, it may also be located on the inside of the shell. A pressurizing gas tank 8 is located adjacent the main tank 2 and is formed having a pressure shell 10 and it also is surrounded by insulating means 12. The shell 4 of the main tank 2 and shell 10 of the pressurizing gas tank 8 are connected by a thermal connection 14. This thermal connection 14 is also insulated by covering 16. The insulating means located around the shell 4, shell 10 and thermal connection 14 is shown as an interconnected covering. The thermal connection is to maintain the pressurizing gas in tank 8 at or near the temperature of the liquid in the main tank 2. The shell 10 could be located within the liquid in tank 2 to obtain the same effect, that is, maintain the pressurizing gas at approximately the temperature of the liquid in the main tank.

A manifold 18 is located in the bottom of the shell 4 and has an inlet pipe 20 which extends to the exterior of the tank 2. This manifold 18 has a plurality of openings for permitting pressurizing gas to pass therefrom into the tank 2. Conduit means 22 connects the interior of the pressurizing gas tank 8 with the inlet pipe 20 and includes a check valve 24 adjacent the inlet pipe 20 and a shutoff valve 26 adjacent the tank 8 with a pressure regulator valve 28 located therebetween.

The bottom of tank 2 has an outlet conduit 30. This conduit is connected to a propellant control 32 which in turn is connetced by a conduit 34 to an injector 36 of a rocket engine 38. A second propellant tank 40 has its propellant connected by a conduit 42 through a control 44 to the injector head 36. This injector can be of the type shown in U.S. Patent No. 3,115,009 which uses two propellants. The propellant in tank 2 can be liquid hydrogen and the propellant in tank 40 can be liquid oxygen.

Although insulation is used on the tanks and thermal connection 14, eventually some heat leaks in, tending to cause the propellant to warm up and increase tank pressure. To keep this propellant from warming up, a cooling system is provided. Two pipes 50 and 52 extend through the side of the tank 2, the inner ends of the pipes are located at the bottom of the tank and have inlet covers thereover permitting flow of the liquid propellant into the pipes. These inlet covers 54 and 56 are box-like members having a plurality of small openings therein.

The outer ends of the pipes are connected to a manifold conduit 58 which extends through the wall of said tank 2 back into the interior of the tank and is connected at its inner end to a network of tubes 60 around the walls of the tank. The other ends of these tubes 60 are connected to a conduit 62 which extends through the wall of said tank 2 back to the exterior thereof. Conduit 62 is connected to conduit 64 which is in heat exchange contact with 40 so that its remaining low temperature can be used to cool the other propellant.

Each tube 50 and 52 contains throttle openings 66 and 68, respectively. These throttle openings are placed at some fixed value to provide a proper pressure drop thereacross. The pressure in manifold conduit 58 is at a pressure well below the vapor pressure. This drop in pressure causes a small fraction of the propellant in the conduit 58 to evaporate and the remainder to become colder. The difference between main tank pressure and the outside pressure causes the coolant to flow without the need of a pump.

A temperature sensor 70 having a probe located within the main tank 2 is mechanically connected to shutoff valves 72 and 73 so that they will be opened if the propellant temperature rises above a desired level and closed if the temperature drops below a desired level. The cooling system including the pipes 52 and throttle opening 68 provides a low rate of cooling for ordinary use. The pipe 50 with throttle opening 66 operates at a little higher temperature and provides a reserve cooling capacity for more severe conditions.

Whenever the pressure in tank 2 falls below a desired level, pressurizing gas is added. This is accomplished by opening valve 26 in response to such a signal. Automatic means can be connected to operate valve 26 or it can be opened manually upon the visual monitoring of a pressure gauge. The pressure regulator 28 maintains the pressurizing gas at a desired value and check valve 24 prevents reverse flow through pipe 20.

The pressurizing gas is injected from manifold 18 located below the surface of the propellant liquid so that it bubbles up through the liquid. This causes some of the propellant to evaporate, so that the gas space 75 becomes filled partly with evaporated propellant and partly with pressurizing gas. This reduces the amount of pressurizing gas required, and the evaporation cools the liquid propellant, reducing its vapor pressure, which is very desirable. More important, however, this keeps the liquid and the gas above the liquid in equilibrium, that is, the temperature of the liquid and the gas above the liquid is equal and the vapor pressure of the liquid propellant is equal to the partial pressure of the evaporated propellant, then the passage of time does not of itself cause a pressure change.

When the temperature of the propellant rises above a desired level, the temperature sensor 70 actuates valves 72 and 73 so that they will be opened at the proper time to place the cooling system into operation. When one of the valves is opened and the liquid propellant is allowed to flow from the tank 2 through a throttle opening 66 or 68, the pressure drop causes a small fraction of the propellant in the manifold pipe 58 to evaporate and the remainder to become colder. This propellant is then circulated through the network of tubes 60 around the propellant tank 2 and is evaporated as it is warmed up to its boiling point. This evaporation cools the propellant in the tank. After the evaporated propellant has cooled the tank, it is still cool and can be passed over a second propellant tank 40 for maximum efficiency before it is discharged overboard or used in some other manner.

It is to be understood that the invention is not limited to the specific descriptiton above or specific figures shown, but may be used in other ways without departure from its spirit as defined by the following claims.

I claim:

1. In combination, a cold liquid supply tank, a pressurizing gas supply tank, an outlet conduit extending from said liquid tank, conduit means extending from the interior of said pressurized gas tank to the interior of said liquid tank, a manifold in said liquid tank connected to said conduit means having a plurality of holes and located below the surface level of the liquid, said conduit means having controls for permitting pressurizing gas to flow from said tank to said manifold when pressurizing is necessary, means for withdrawing a portion of the cold liquid from said tank to use it for cooling the remainder of the liquid, said last-named means including a conduit extending from the interior to the exterior of said cold liquid supply tank, said conduit having a throttle opening therein, said conduit being connected to a second conduit means which extends back into said cold liquid supply tank for contact with the liquid therein, said second conduit means returning to the exterior of said cold liquid supply tank, and means for turning flow through this conduit off and on as necessary to provide the desired amount of cold liquid supply tank cooling.

2. A combination as set forth in claim 1 wherein said second conduit means returning to the exterior of said cold liquid supply tank is connected to a third conduit extending to a second cold liquid supply tank.

3. A combination as set forth in claim 1 wherein the pressurizing gas is helium.

4. A combination as set forth in claim 1 wherein said controls for said conduit means includes a pressure regulator valve and a shut-off valve.

5. A combination as set forth in claim 1 wherein said cold liquid supply tank is connected to the pressurizing gas supply tank by a thermal connection.

6. A combination as set forth in claim 5 wherein said cold liquid supply tank, pressurizing gas supply tank, and thermal connection is covered by an insulating cover.

7. A combination as set forth in claim 1 wherein said throttle opening includes means for controlling the size of said opening to set a desired fixed size opening.

8. A combination as set forth in claim 1 wherein said last-named means includes a temperature responsive control having a probe in said cold liquid supply tank.

9. A cold gas pressurizing system for a cold liquid tank consisting of a first cold liquid supply tank, a cold liquid in said first tank, a second pressurizing gas supply tank, a pressurizing gas in said second tank, said pressurizing gas being a gas which will cause the cold liquid to evaporate as it bubbles therethrough, an outlet conduit extending from said liquid tank, conduit means extending from the interior of said pressurized gas tank to the interior of said liquid tank, a manifold in said liquid tank connected to said conduit means having a plurality of holes and located below the surface level of the liquid, said conduit means having controls for permitting pressurizing gas to flow from said tank to said manifold when pressurizing is necessary.

10. A cold liquid propellant supply tank refrigerating system consisting of a cold liquid propellant supply tank, means for withdrawing a portion of the cold liquid propellant from said tank, a throttle opening within the withdrawal line to reduce the pressure of the withdrawn liquid propellant to below its vapor pressure, passage means attached to the tank through which the throttled propellant may flow to cool the liquid propellant in said tank, said passages connected at one end to the throttle opening, the other end carrying throttled warmer propellant to the exterior of the tank, and a control valve to turn the withdrawn flow off and on as needed to maintain the desired tank temperature.

11. A combination as set forth in claim 9 wherein means are provided for maintaining the pressurized gas in the second tank near the temperature of the cold liquid in the first tank.

12. A combination as set forth in claim 11 wherein the last-name means includes a thermal connection between the cold liquid supply tank and the pressurizing gas tank.

13. A combination as set forth in claim 9 wherein the pressurized gas is helium.

14. A combination as set forth in claim 9 wherein the cold liquid is liquid hydrogen.

15. A combination as set forth in claim 10 wherein said throttle opening includes means for controlling the size of said opening to set a desired fixed size opening.

References Cited

UNITED STATES PATENTS

| | | | |
|---|---|---|---|
| 2,037,734 | 4/1936 | Zenner | 62—53 |
| 2,968,163 | 1/1961 | Beckman | 62—52 |
| 3,191,956 | 6/1965 | Maher et al. | 62—52 |

LLOYD L. KING, Primary Examiner

U.S. Cl. X.R.

60—39.48, 7; 62—52